No. 877,787.  
PATENTED JAN. 28, 1908.
H. H. MAY.  
TRAP.  
APPLICATION FILED AUG. 15, 1907.
Fig. 1.
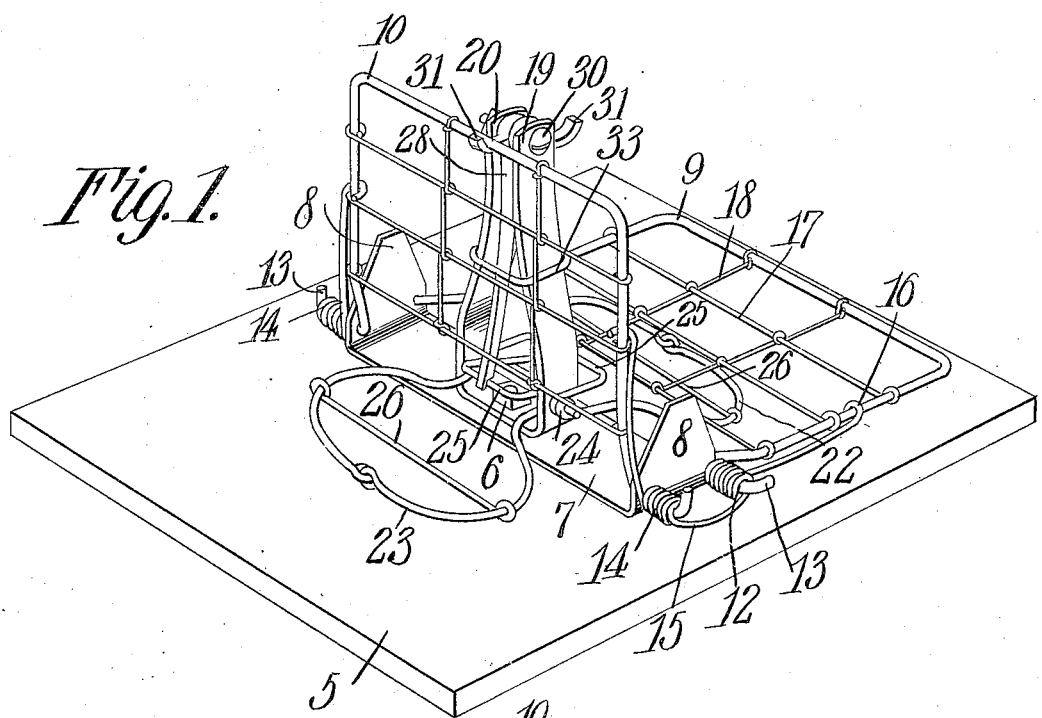
Fig. 3.
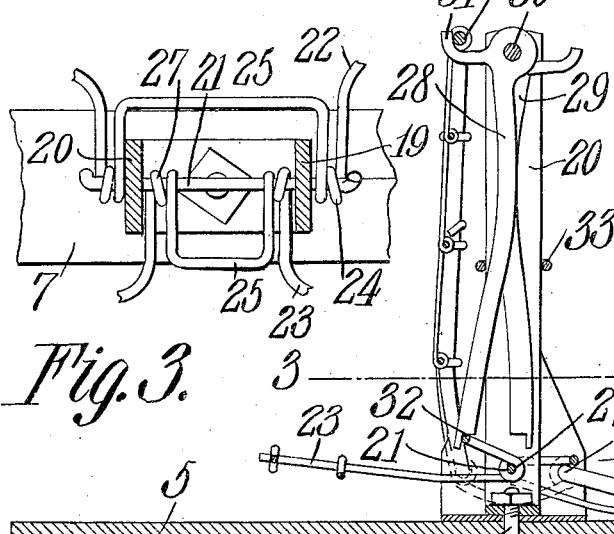
Fig. 2.
Witnesses
Inventor  
Henry H. May.  
By C. A. Snow & Co.  
Attorneys

UNITED STATES PATENT OFFICE.

HENRY H. MAY, OF NEW ALBIN, IOWA.

TRAP.

No. 877,787.

Specification of Letters Patent.

Patented Jan. 28, 1908.

Application filed August 15, 1907. Serial No. 388,689.

*To all whom it may concern:*

Be it known that I, HENRY H. MAY, a citizen of the United States, residing at New Albin, in the county of Allamakee and State of Iowa, have invented a new and useful Trap, of which the following is a specification.

This invention relates to animal traps of that general class especially designed for catching rats, mice and other rodents and has for its object to provide a comparatively simple and inexpensive device of this character capable of catching two or more animals at each operation of the trap.

A further object of the invention is to provide a double acting trap including a pair of spring actuating jaws movable laterally to operative position and adapted to impale the animal or animals and effectually prevent escape of the same.

A still further object of the invention is to generally improve this class of devices so as to increase their utility, durability and efficiency as well as to reduce the cost of manufacture.

Further objects and advantages will appear in the following description, it being understood that various changes in form, proportions and minor details of construction may be resorted to within the scope of the appended claims.

In the accompanying drawings forming a part of this specification: Figure 1 is a perspective view of an animal trap constructed in accordance with my invention, one of the impaling jaws being shown in operative position and the other in inoperative position. Fig. 2 is a vertical sectional view of the same. Fig. 3 is a transverse sectional view taken on the line 3—3 of Fig. 2.

Similar numerals of reference indicate corresponding parts in all of the figures of the drawings.

The improved trap forming the subject matter of the present invention includes a base or support 5 preferably rectangular in shape, as shown, and formed of wood or other suitable material. Extending transversely across the center of the base and rigidly secured thereto in any suitable manner as by a bolt or similar fastening device 6 is a metal strip 7 having its opposite ends bent upwardly to form vertically disposed ears 8 which form supports for the spring actuated impaling jaws 9 and 10. The jaws 9 and 10 each consist of a substantially rectangular frame preferably formed of a single piece of wire having its opposite ends bent laterally and extended through suitable openings 11 in the adjacent ears 8 to produce oppositely disposed arms 12 the terminals of which are bent laterally, as indicated at 13. Mounted on the arms 12 are coiled springs 14 each having one terminal convolution thereof connected with the terminal convolution of an adjacent spring by a connecting rod or bar 15 while its opposite terminal convolution is extended laterally in substantially parallel relation to the frame of the adjacent impaling jaw and is provided with a terminal hook 16 which embraces the frame of said jaw, as shown. The impaling jaws are preferably reinforced and strengthened by the provision of a plurality of longitudinally disposed rods or wires 17 connected by transverse rods 18.

Secured to the central portion of the strip 7 between the pivoted impaling jaws is a trigger support, the latter being preferably formed of a single piece of metal having its intermediate portion rigidly secured to the strip 7 by means of the bolt 6, while its opposite ends are bent upwardly and inwardly to form spaced converging arms 19 and 20. Extending transversely through the lower portion of the arms 19 and 20 is a pin 21 upon which are pivotally mounted the bait holders 22 and 23.

The bait holder 22 is preferably formed of a single piece of wire bent to produce oppositely disposed coils 24 which engage the pin 21 at the outer faces of the bars 19 and 20, said coils or eyes being connected by a transverse yoke 25. The wire forming the bait holder 22 is bent to form an elongated loop the walls of which are connected by a transverse rod 26 which forms a support for the bait.

The bait holder 23 is similar in construction to the bait holder 22 with the exception that the eyes 27 are arranged on the inner faces of the bars 19 and 20, it being here noted that the bait holders are pivotally mounted on the pin 21 so as to permit the yokes 25 to be tilted upwardly in engagement with the triggers 28 and 29. The triggers 28 and 29 are pivotally mounted on a rod or bolt 30 connecting the upper ends of the arms 19 and 20, each trigger having its pivoted end provided with a hooked terminal 31 adapted to engage the adjacent end of the impaling jaw and its opposite end provided with a recessed portion 32 adapted to receive the yoke 25 of the adjacent bait holder, thereby to lock the impaling jaws in set position.

In operation the bait is placed on the bait holders and the impaling jaws swung laterally and upwardly in engagement with the hooked terminals 31 after which the bait holders are tilted upwardly until the yokes 25 of the bait holders enter the recesses 32. It will thus be seen that when a rat or other animal attempts to steal the bait the downward pressure on the bait holder will disengage the yoke from the adjacent trigger thus permitting the long arm of said trigger to drop by gravity to the center of the trigger support and release the hooked terminals 31 from engagement with the impaling jaws so that the springs 14 will force the jaw to closed position and thereby impale the animal.

Surrounding the arms 19 and 20 of the trigger support is a loop or keeper 33 which serves to limit the lateral movement of the triggers 28 and 29 and thus retain the same in proper position to engage the yokes of the bait holders.

The traps may be made in different sizes and shapes and may be nickeled, japanned or otherwise coated so as to give the same a neat attractive appearance.

From the foregoing description it will be seen that there is provided an extremely simple, inexpensive and efficient device admirably adapted for the attainment of the ends in view.

Having thus described the invention what is claimed is:

1. A trap including a base, a spring actuated impaling jaw pivotally mounted on the base, a bait holder, spaced arms extending vertically from the base and constituting a trigger support, a trigger pivotally mounted between said arms and having one end thereof provided with a hooked terminal adapted to engage the free end of the jaw, the opposite end of said trigger being provided with a terminal recess for the reception of the bait holder, and a loop connecting the arms of the trigger support for limiting the lateral movement of said trigger.

2. A trap including a base, a spring actuated jaw pivotally mounted on the base, a trigger support including spaced arms, a pin extending transversely through said arms, a bait holder pivotally mounted on the pin and provided with a yoke, a trigger pivotally mounted between the arms and having one end thereof provided with a hooked terminal adapted to engage the impaling jaw, the opposite end of the trigger being provided with a recess for the reception of the yoke of the bait support, and a loop connecting the arms of the trigger support for limiting the lateral movement of said trigger.

3. A trap including a base, a spring actuated impaling jaw pivotally mounted on the base, a trigger support, a pin extending transversely through the trigger support, a bait holder having oppositely disposed eyes for the reception of the pin, said eyes being connected by a transverse yoke, a trigger pivotally mounted on the support and having one end thereof provided with a hooked terminal for engagement with the impaling jaw, the opposite end of the trigger being formed with a recess for the reception of the yoke of the bait holder, and means carried by the trigger support for limiting the lateral movement of said trigger.

4. A trap including a base, a plate secured to the base and having its opposite ends bent upwardly to form vertically disposed ears, spring jaws pivotally mounted in said ears and provided with laterally extending arms, spring coils carried by said arms and bearing against said jaws, a trigger support secured to the plate, bait holders pivotally mounted on the support and provided with transverse yokes, and triggers pivotally mounted on said support and each having one end thereof provided with a terminal hook for engagement with the adjacent jaw and its opposite end formed with a recess for the reception of a yoke of the adjacent bait holder.

5. A trap including a base, a plate secured to the base and provided with oppositely disposed ears, spring actuated impaling jaws pivotally mounted on the ears and provided with laterally extending arms, coiled springs carried by the arms of the impaling jaws, a trigger support secured to the plate and having vertically disposed arms, a transverse pin piercing the arms, a bait holder for one of the jaws pivotally mounted on the transverse pin at the outer faces of the vertical arms and provided with a transverse yoke, a bait holder for the other jaw pivotally mounted on the transverse pin at the inner faces of said arms and provided with a similar yoke, a pin connecting the upper ends of the vertical arms, and triggers pivotally mounted on the pin at the upper ends of said arms and each having its pivoted end provided with a hook adapted to engage the adjacent jaw, the opposite end of each trigger being formed with a recess adapted to receive the yoke of the adjacent bait holder.

In testimony that I claim the foregoing as my own, I have hereto affixed my signature in the presence of two witnesses.

HENRY H. MAY.

Witnesses:
  L. H. GAARDER,
  LUDWIG SCHUBBERT.